(12) United States Patent
Pineo et al.

(10) Patent No.: US 7,487,826 B2
(45) Date of Patent: Feb. 10, 2009

(54) PLUG BYPASS VALVES AND HEAT EXCHANGERS

(75) Inventors: Gregory Merle Pineo, Kleinburg (CA); Brian Edward Cheadle, Brampton (CA)

(73) Assignee: Dana Canada Corporation, Oakville, Ontario (CA)

( * ) Notice: Subject to any disclaimer, the term of this patent is extended or adjusted under 35 U.S.C. 154(b) by 60 days.

(21) Appl. No.: 11/264,494

(22) Filed: Nov. 1, 2005

(65) Prior Publication Data

US 2007/0158059 A1 Jul. 12, 2007

Related U.S. Application Data

(63) Continuation of application No. 09/918,082, filed on Jul. 30, 2001, now abandoned.

(30) Foreign Application Priority Data

Jul. 26, 2001 (CA) .................................. 2354217

(51) Int. Cl.
*G05D 23/00* (2006.01)
(52) U.S. Cl. ..................... 165/297; 165/103; 165/173
(58) Field of Classification Search ................. 165/297, 165/296, 103, 101, 153, 173; 137/597, 630.19, 137/630.22
See application file for complete search history.

(56) References Cited

U.S. PATENT DOCUMENTS

| | | | |
|---|---|---|---|
| 2,159,468 A | 5/1939 | Young et al. |
| 2,396,053 A | 3/1946 | McEntire |
| 2,433,454 A | 12/1947 | Hoffman |
| 2,469,212 A | 5/1949 | Shaw |
| 3,404,837 A | 10/1968 | James |
| 3,440,833 A * | 4/1969 | Fernandes ................... 165/297 |
| 3,754,706 A | 8/1973 | Tao |
| 3,779,306 A | 12/1973 | Wilson |
| 3,943,970 A | 3/1976 | Knapp |
| 3,952,764 A | 4/1976 | Keller, III |
| 4,024,909 A | 5/1977 | Hofmann, Jr. |
| 4,114,571 A | 9/1978 | Ruf |
| 4,469,275 A | 9/1984 | DeSalve |
| 4,508,132 A | 4/1985 | Mayfield et al. |
| 4,527,681 A | 7/1985 | Sommer |
| 4,574,836 A | 3/1986 | Barnard, Jr. |
| 4,669,532 A | 6/1987 | Tejima et al. |
| 4,846,219 A | 7/1989 | Schaefer |
| 5,085,468 A | 2/1992 | Billotte |
| 5,423,373 A | 6/1995 | Ramberg |
| 5,551,506 A | 9/1996 | Nishishita |
| 5,553,664 A | 9/1996 | Nishishita et al. |

(Continued)

*Primary Examiner*—Ljiljana (Lil) V Ciric
(74) *Attorney, Agent, or Firm*—Ridout & Maybee LLP

(57) ABSTRACT

Bypass valves and heat exchangers employing same are provided where the bypass valves cause the flow through the heat exchangers to be short-circuited under certain temperature conditions. The heat exchangers are formed of stacked plate pairs or tubes having enlarged communicating distal end portions forming inlet and outlet manifolds. The bypass valves can be plugged in where desired between the enlarged distal end portions to produce bypass flow between the inlet and outlet manifolds. The bypass valves include a housing which can be brazed in place during brazing of the heat exchanger. The housing has inlet and outlet openings in communication with the respective inlet and outlet manifolds for bypass flow therebetween. A removable temperature responsive actuator is located in the housing for blocking and unblocking the bypass flow through the valve.

6 Claims, 9 Drawing Sheets

U.S. PATENT DOCUMENTS

| | | |
|---|---|---|
| 5,609,203 A | 3/1997 | Kinugasa et al. |
| 5,875,834 A | 3/1999 | Brooks |
| 5,904,292 A | 5/1999 | McIntosh |
| 5,964,282 A | 10/1999 | Seiler et al. |
| 5,988,265 A | 11/1999 | Marthaler |
| 6,161,614 A | 12/2000 | Woodhull, Jr. et al. |
| 6,253,837 B1 | 7/2001 | Seiler et al. |
| 6,302,191 B1 | 10/2001 | Wickham et al. |
| 6,772,958 B1 | 8/2004 | Lamb et al. |
| 7,178,553 B2 * | 2/2007 | Peric et al. ............. 137/630.19 |

* cited by examiner

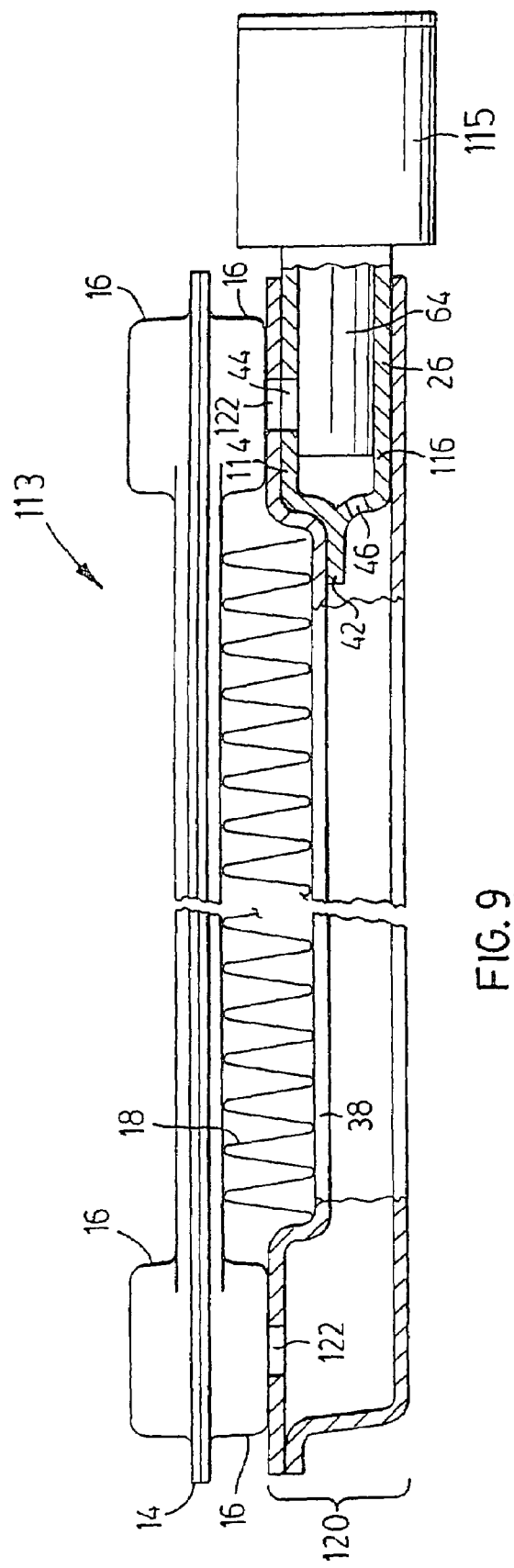

PLUG BYPASS VALVES AND HEAT EXCHANGERS

This application is a continuation of U.S. application Ser. No. 09/918,082 filed Jul. 30, 2001 now abandoned, the entire disclosure of which is incorporated herein by reference, which itself claims priority to Canadian Application No. 2,354,217 filed on Jul. 26, 2001.

BACKGROUND OF THE INVENTION

This invention relates to heat exchangers, and in particular, to bypass valves for bypassing or short-circuiting flow from the heat exchanger inlet to the heat exchanger outlet under conditions where the heat transfer function of the heat exchanger is not required or is only intermittently required.

In certain applications, such as in the automotive industry, heat exchangers are used to cool or heat certain fluids, such as engine oil or transmission fluid or oil. In the case of transmission fluid, for instance, a heat exchanger is usually used to cool the transmission fluid. The heat exchanger is usually located remote from the transmission and receives hot transmission fluid from the transmission through supply tubing, cools it, and delivers it back to the transmission again through return tubing. However, when the transmission is cold, such as at start-up conditions, the transmission oil is very viscous and does not flow easily through the heat exchanger, if at all. In such cases, the transmission can be starved of fluid and this may cause damage to the transmission or at least erratic performance. Damage can also be caused to the transmission if the quantity of fluid returned is adequate, but is over-cooled by the heat exchanger due to low ambient temperatures. In this case, water may accumulate in the transmission fluid as a result of condensation (which normally would be vaporized at higher temperatures) and this may cause corrosion damage or transmission fluid degradation.

In order to overcome the cold flow starvation problem, it has been proposed to insert a bypass valve between the supply and return tubing to and from the heat exchanger. This bypass valve may be temperature responsive so that it opens causing bypass flow when the transmission fluid is cold, and it closes to prevent bypass flow when the transmission fluid heats up to operating temperature An example of such a bypass valve is shown in U.S. Pat. No. 6,253,837 issued to Thomas F. Seiler et al. While this approach works satisfactorily, the heat exchanger and bypass valve assembly becomes quite large and includes fluid inlet and outlet tubing that may not otherwise be required.

In the present invention, the bypass valve can be incorporated as an integral part of the heat exchanger as a plug-in item that can be located anywhere desired between the inlet and outlet flow manifolds of the heat exchanger.

BRIEF DESCRIPTION OF THE DRAWINGS

Preferred embodiments of the invention will now be described by way of example, with reference to the accompanying drawings, in which:

FIG. 9 is an elevational view of a portion of another preferred embodiment of a heat exchanger and bypass valve according to the present invention.

DESCRIPTION OF THE PREFERRED EMBODIMENTS

Figure 1:
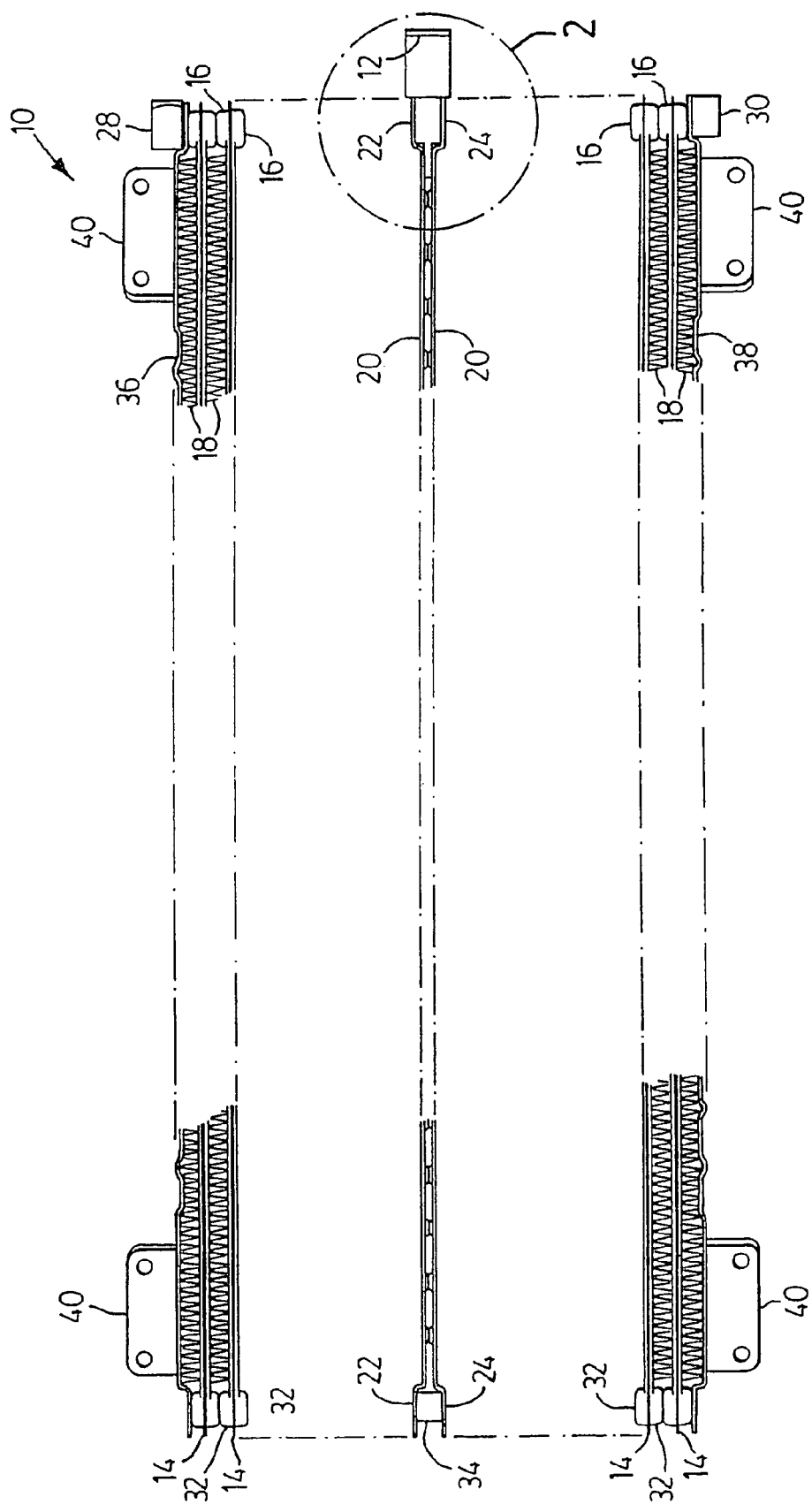
FIG. 1 is an elevational view of a heat exchanger having a preferred embodiment of a bypass valve according to the present invention mounted therein.
Figure 2:
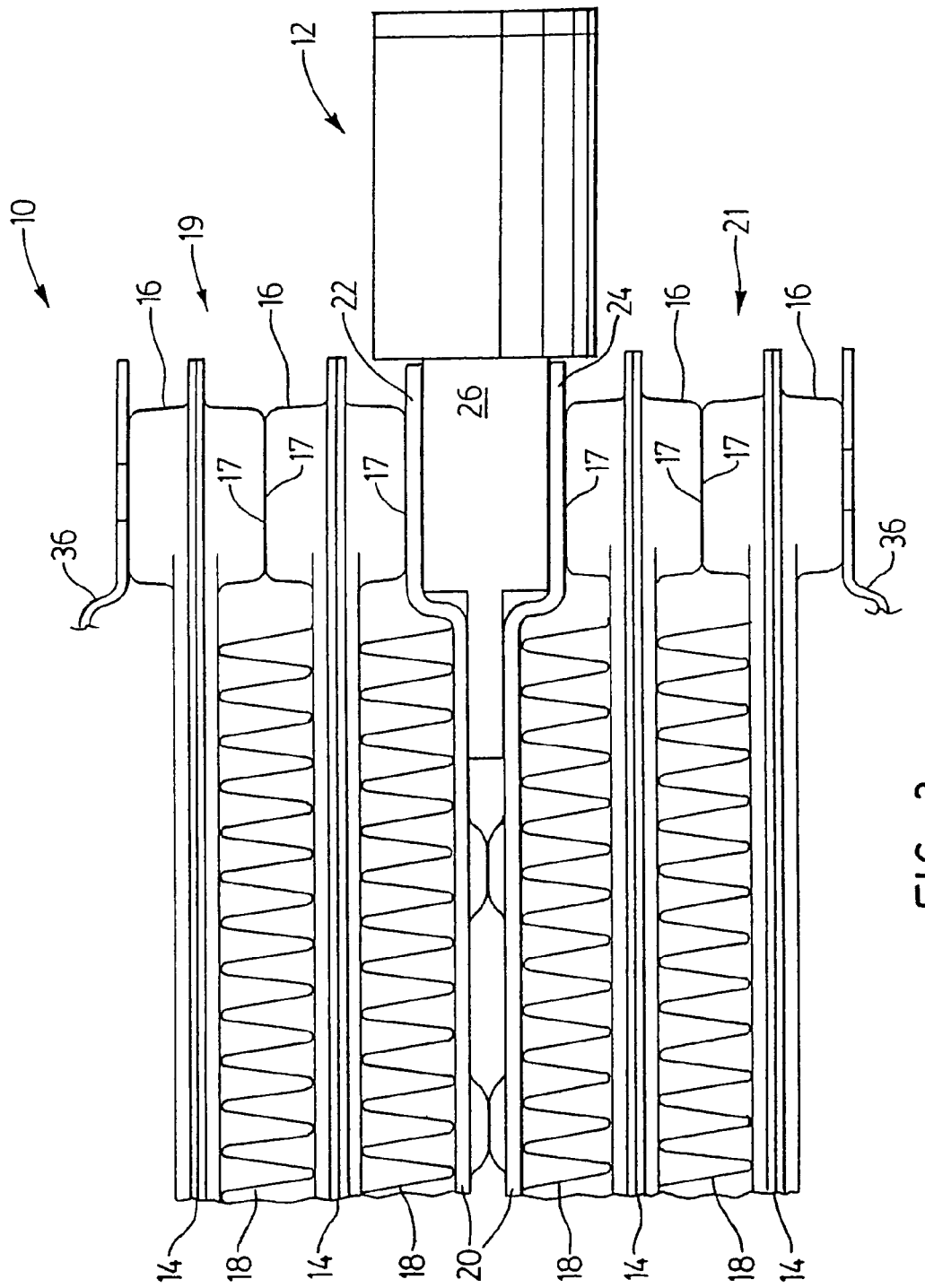
FIG. 2 is an enlarged view of the portion of FIG. 1 indicated by circle 2.

Referring firstly to FIGS. 1 and 2, a heat exchanger is generally indicated by reference in 10, and a preferred embodiment of a bypass valve according to the present invention is generally indicated by reference numeral 12. Heat exchanger 10 is formed of a plurality of parallel, spaced-apart, tubular members 14 preferably with enlarged distal end portions 16 that have adjacent wall portions 17 defining flow openings (not shown) in communication. Tubular members 14 are preferably formed of mating plate pairs with transversely protruding cupped end portions to form these enlarged end portions 16 that also together form flow manifolds 19 and 21. However, tubular members 14 could be formed of tubes with separate joined enlarged end portions 16, if desired. Alternatively, tubular members of uniform width or thickness could be used, in which case tubular spacers could be used between the tube ends in place of enlarged distal end portions 16. If it is not necessary to space tubular members 14 apart transversely, then such spacers would not be required. Yet another possibility would be to use transversely orientated tubular manifolds 19 and 21 attached in communication with the ends of tubular members 14. For the purpose of this disclosure, the term "distal end portions" is intended to include all of the above-mentioned tube member communicating wall structures. Corrugated cooling fins 18 are located between the tubular members 14 where the tubular members 14 are spaced apart transversely.

In the heat exchangers shown in FIGS. 1 and 2, the tubular members 14 are formed into two upper and lower groups separated by central back-to-back dimpled plates 20 having offset end portions 22, 24. As seen best in FIG. 2, the space between offset end portions 22, 24 provides a location where bypass valve 12 can be plugged into heat exchanger 10. Bypass valve 12 includes a hollow plug portion 26 located in this space, and which will be described in further detail below.

As mentioned above, the enlarged distal end portions 16 have transverse openings therethrough (not shown), so that the distal end portions 16 located above bypass valve 12 are all in communication and form either an inlet or an outlet manifold 19 depending on the direction in which fluid is to flow through heat exchanger 10. Similarly, the enlarged distal end portions 16 located below bypass valve 12 are all in communication and form a respective outlet or inlet manifold 21. As seen best in FIG. 1, an inlet or outlet fitting 28 communicates with the enlarged distal end portions below it and an inlet or outlet fitting 30 communicates with the enlarged distal end portions above it. So, for example, fluid entering inlet fitting 28 travels from right to left as shown in FIG. 1 through all of the tubular members 14 located above dimpled plates 20, to a similar left hand manifold formed by enlarged distal end portions 32, and then downwardly through a crossover fitting 34 into a left hand manifold in the lower section of heat exchanger 10 formed by enlarged distal end portions 32, and then back to the right end and out through outlet fitting 30. Heat exchanger 10 is thus called a two-pass heat exchanger and can have any number of tubular members 14 above or below the dimpled plates 20. In fact, there could just be one tubular member 14 above or below dimpled plates 20, as illustrated in the embodiment shown in FIG. 9 and as described further below.

Heat exchanger 10 also has upper and lower dimpled plates 36. Suitable mounting brackets 40 are attached to dimpled plates 36, 38 as are the inlet and outlet fittings 28, 30.

Figure 3:
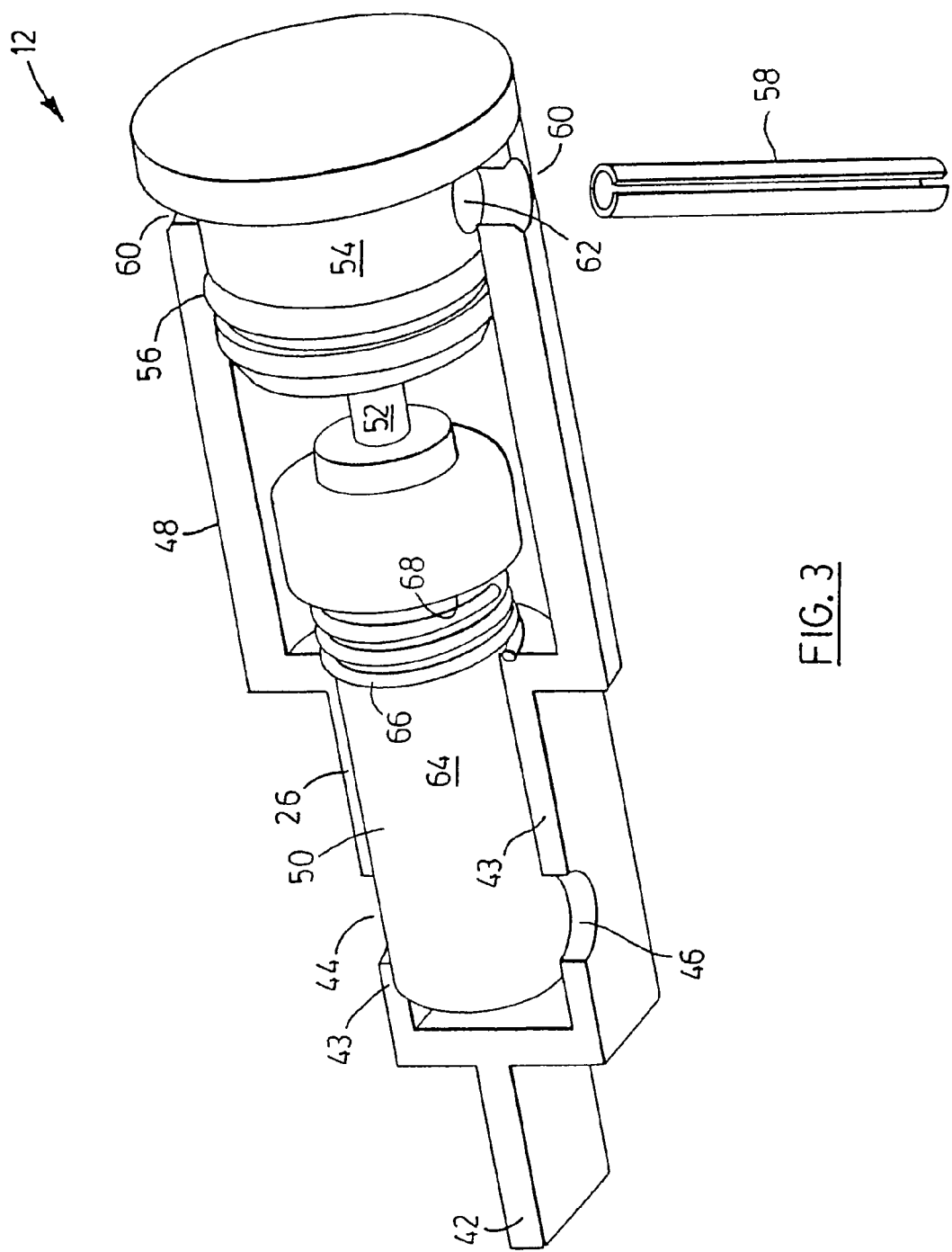
FIG. 3 is a perspective view, partly broken away of the bypass valve of FIG. 2 shown in the closed position.
Figure 4:
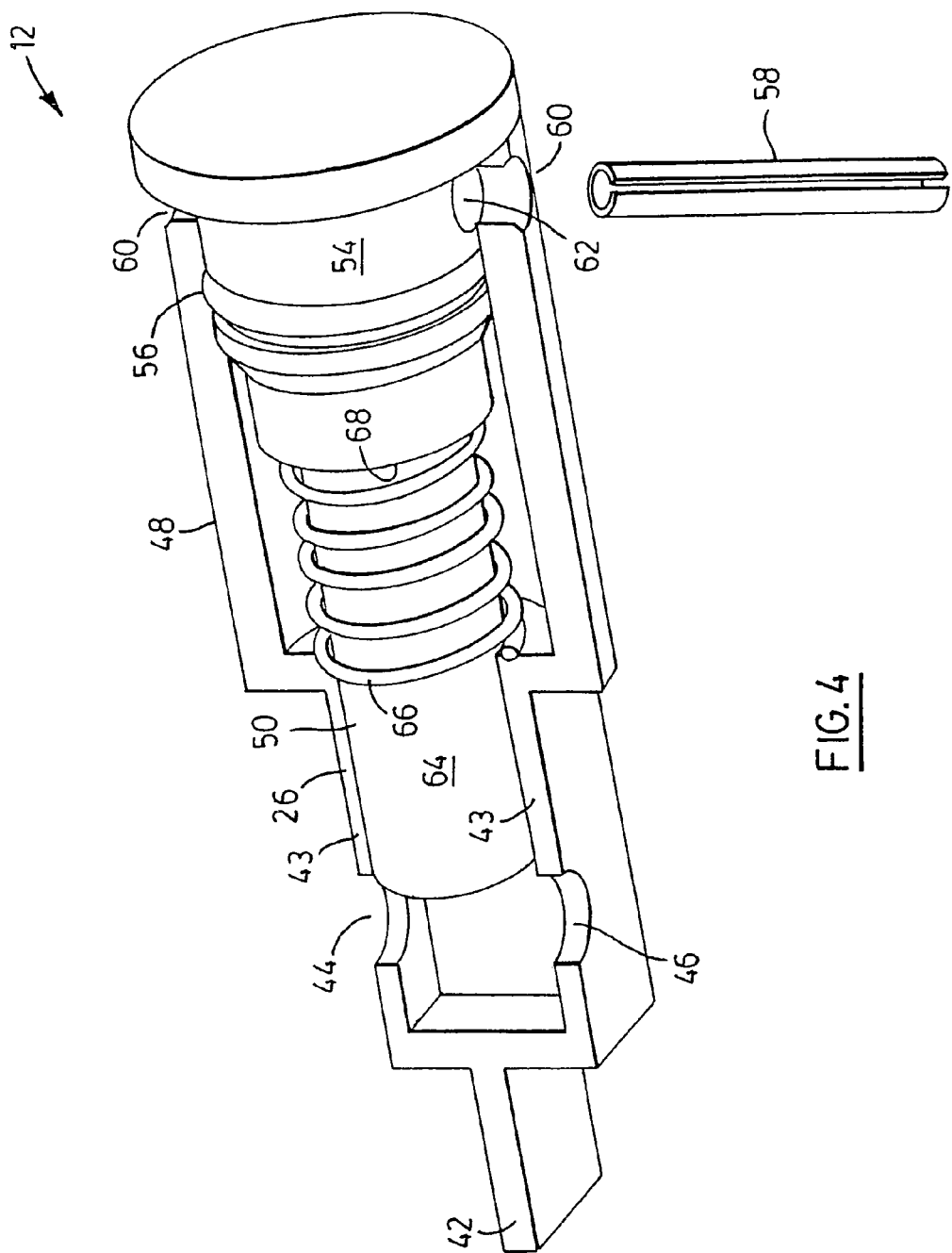
FIG. 4 is a perspective view similar to FIG. 3 but showing the bypass valve in the open position.

Referring next to FIGS. 3 and 4, bypass valve 12 includes a housing 42 having a hollow plug portion 26 with spaced-apart, opposed, flat, parallel plug side walls 43 defining transversely located inlet and outlet openings 44, 46 formed therein for the flow of fluid through plug portion 26 when valve 12 is in the open position as shown in FIG. 4. Plug walls 43 are sealingly mounted between selected adjacent tubular member wall portions 17 of the enlarged distal end portions 16 of tubular members 14. The distal end portions 16 have flat mating surfaces. The offset end portions 22 mate flush against their adjacent distal end portion flat surfaces and the flat housing side walls 43 mate flush against the flat offset end portions 22. However, housing side or plug walls 43 would mate flush against the flat portions of distal end portions 16, if dimpled plates 22 were not used in heat exchanger 10. This mounting allows bypass fluid flow directly between selected distal end portions 16, or respectively between the flow manifolds 19 and 21 and the inlet and outlet openings 44 and 46, or between the inlet and outlet fittings 28, 30 when bypass valve 12 is open. Bypass valve side or plug walls 43 are spaced apart a predetermined distance so as to determine the spacing between adjacent heat exchanger tubular members, especially if dimpled plates 20 are not used.

Bypass valve housing 42 also has an actuator portion 48 located adjacent to and communicating with plug portion 26. A temperature responsive actuator 50 is located in housing 42. Actuator 50 has a central shaft 52 attached to a removable closure 54 located remote from plug portion 26. Removable closure 54 has an O-ring seal 56 and is held in position by a split pin 58 passing through openings 60 in housing actuator portion 40 and a through hole 62 in closure 54.

Temperature responsive actuator 50 has a reciprocating barrel portion 64 which forms a plunger slidably located in housing plug portion 26 to block and unblock flow between inlet and outlet openings 44, 46. A spring 66 is located in housing actuator portion 48 and bears against an annular shoulder 68 on barrel 64 to act as bias means to urge the actuator 50 to retract so that barrel or plunger 64 unblocks the flow of fluid through inlet and outlet openings 44, 46 of bypass valve 12, when the actuator is not extended due to temperature, as described next below.

Temperature responsive actuator 50 is sometimes referred to as a thermal motor and it is a piston and cylinder type device. Barrel or plunger 64 is filled with a thermal sensitive material, such as wax, that expands and contracts, causing the actuator to extend axially upon being heated to a predetermined temperature and to retract upon being cooled below this predetermined temperature. Where bypass valve 12 is used in conjunction with an automotive transmission fluid or oil cooler, this predetermined temperature is about 80° C., which is the temperature of the fluid from the transmission when bypass flow is no longer required.

Figure 5:
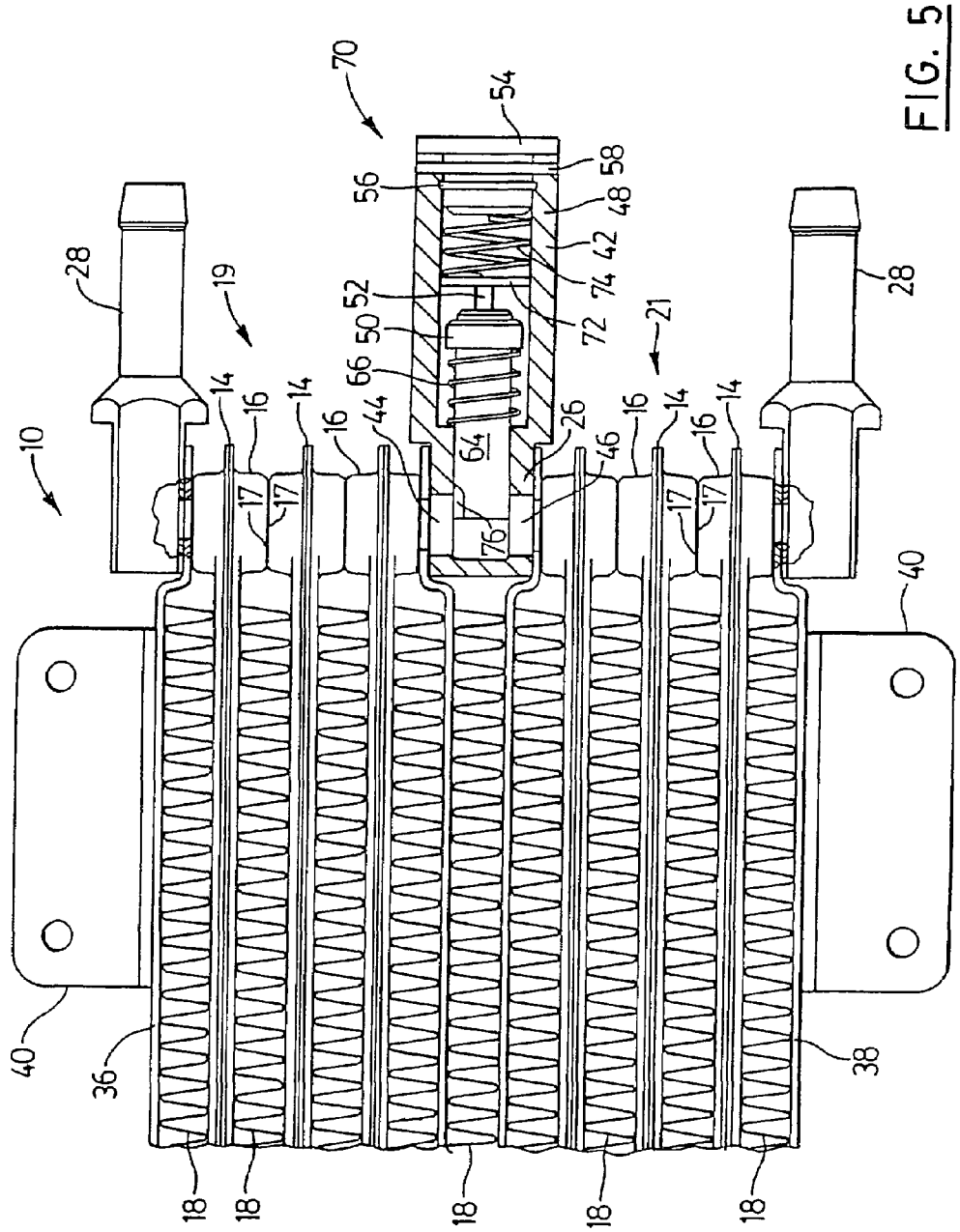
FIG. 5 is an elevational view similar to FIG. 2, but showing another preferred embodiment of a bypass valve according to the present invention, the valve being shown partially in cross-section.

Referring next to FIG. 5, another preferred embodiment of a bypass valve according to the present invention is generally indicated by reference numeral 70. Bypass valve 70 is similar to bypass valve 12 except that a sliding plate 72 bears against central shaft 52 and a spring 74 is located in housing actuator portion 48 to urge central shaft 52 toward the housing plug portion 26. Spring 74 absorbs any pressure spikes or peeks that may occur in the inlet and outlet manifolds of heat exchanger 10. A notch 76 is formed in barrel 64 to allow the fluid to act against the end of barrel 64 and provide this pressure relief even when bypass valve 70 is closed. A bleed hole through plunger or barrel 64 communicating with inlet opening 44 could also be used in place of notch 76 for this purpose. Otherwise, bypass valve 70 is substantially the same as bypass valve 12.

Figure 6:
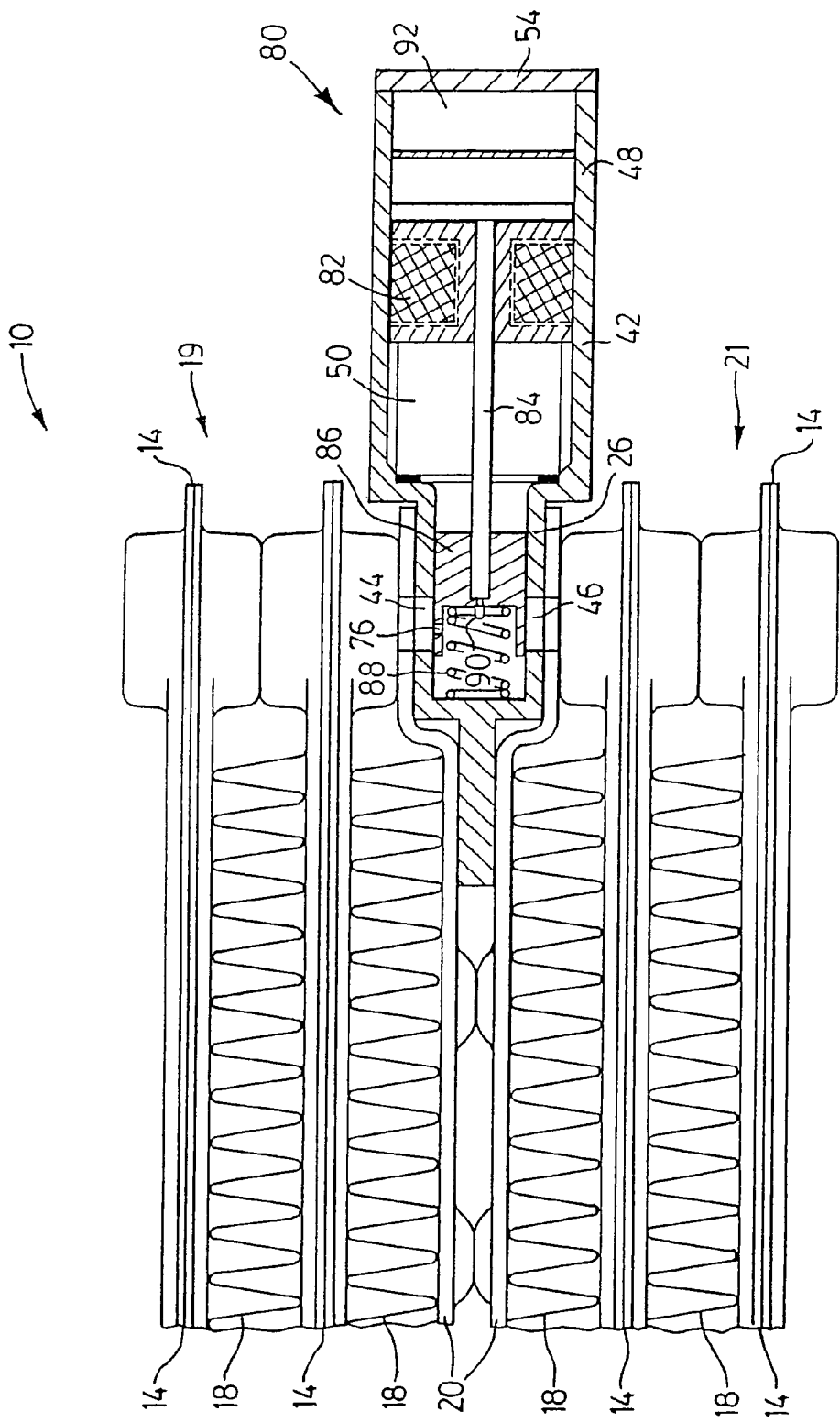
FIG. 6 is an elevational view similar to FIG. 2, yet showing another preferred embodiment of a bypass valve according to the present invention, the valve being shown in cross-section and in the closed position.
Figure 7:
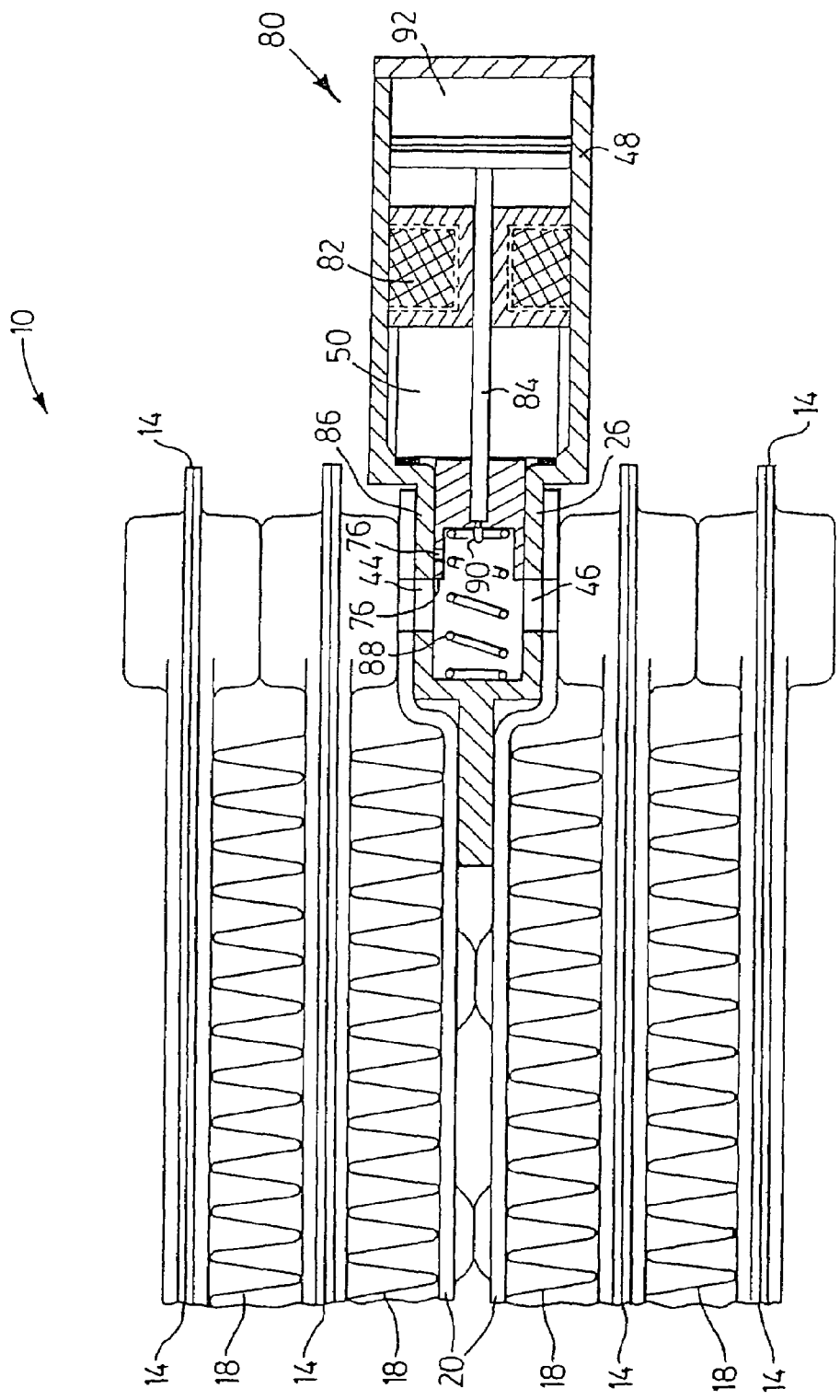
FIG. 7 is an elevational view similar to FIG. 6, but showing the bypass valve of FIG. 6 in the open position.

Referring next to FIGS. 6 and 7, another preferred embodiment of a bypass valve according to the present invention is generally indicated by reference numeral 80. In bypass valve 80, the temperature responsive actuator 50 includes a solenoid having a solenoid coil 82 and a central actuator shaft 84 attached to a plunger 86. Plunger 86 also has a notch or bleed hole 76 to provide pressure spike relief when valve 80 is closed. Actuator shaft 84 extends upon energization of solenoid coil 82, so that plunger 86 blocks flow between the housing inlet and outlet openings 44, 46. A spring 88 located in housing plug portion 26 bears against plunger 86 to act as bias means for urging the actuator shaft 84 to retract upon the de-energization of solenoid coil 82.

A temperature sensor 90 is attached to plunger 86 and is in the form of a thermistor electrically coupled to solenoid coil 82 for actuation of the solenoid coil when the temperature of the fluid going through heat exchanger 10 reaches a predetermined temperature. Temperature sensor 90 could be located elsewhere in bypass valve 80, or even elsewhere in heat exchanger 10. Preferably, temperature sensor 90 is electrically connected to an electrical control circuit 92 mounted in housing actuator portion 48. Electrical control circuit 92 is in turn is electrically connected to solenoid coil 82 for controlling the movement of plunger 86 in accordance with the temperature sensed by temperature sensor 90. In this way, the opening of bypass valve 80 could be controlled to provide variable opening, rather than a simple on or off, but the latter is also possible.

Figure 8:
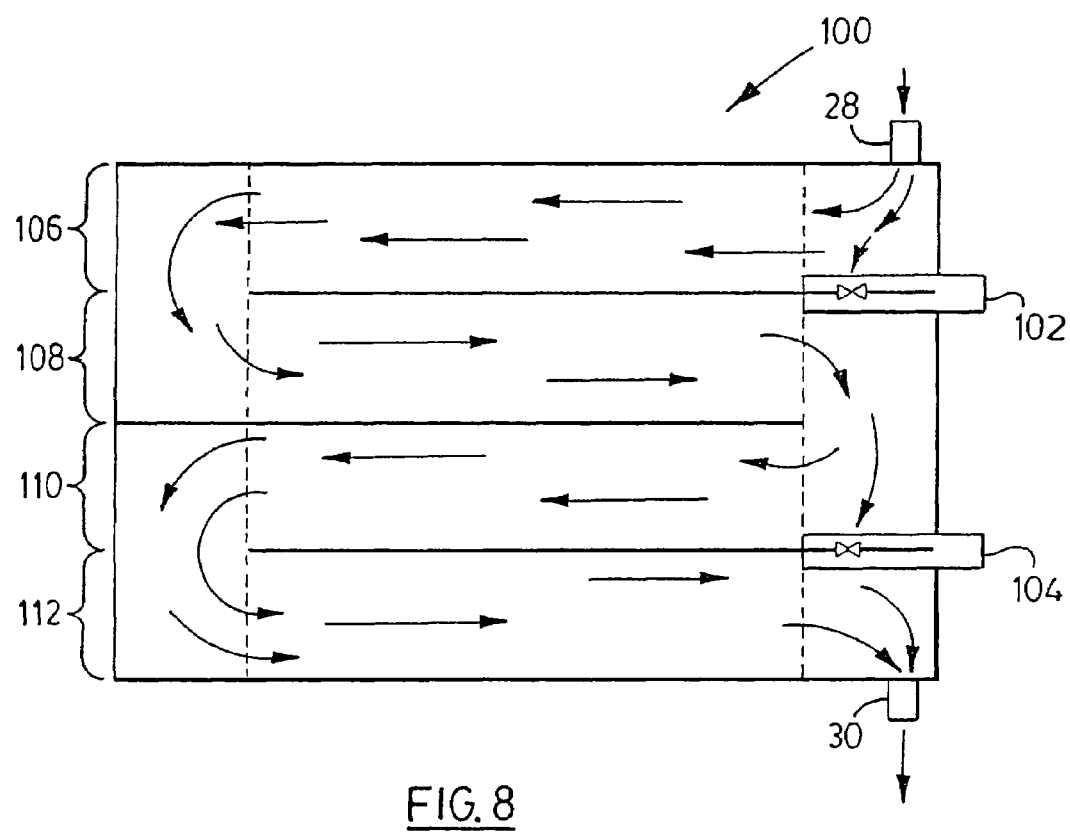
FIG. 8 is a schematic view of a heat exchanger having multiple passes and more than one bypass valve.

Referring next to FIG. 8, a heat exchanger 100 is shown schematically and it is like two heat exchangers 10 of FIG. 1 mounted in series. Two bypass valves 102, 104 are used to provide thermal modulation of the fluid flowing through the heat exchanger 100. Bypass valve 102 may have a predetermined temperature set point or activation temperature, and bypass valve 104 may have a somewhat higher temperature set point or activation temperature. Heat exchanger 100 is a four pass heat exchanger having four groups or stacks 106, 108, 110 and 112 of tubular members.

Where both bypass valves 102 and 104 are open, such as during cold flow operation, there is full fluid bypass from inlet fitting 28 to outlet fitting 30. Where bypass valve 102 is closed and valve 104 is open, such as during warm up or an interim temperature of fluid flowing through heat exchanger 100, there would be fluid flow through the top two passes 106 and 108 of heat exchanger 100, but passes 110 and 112 would be bypassed through bypass valve 104. Where the fluid reaches its hot operating temperature, both bypass valves 102 and 104 would close giving flow through all four passes 106, 108, 110 and 112 and no bypass flow at all. Additional multiples of passes and bypass valves could be used in a single heat exchanger as well. Any of the types of bypass valves described above could be used in heat exchanger 100.

Referring next to FIG. 9, other preferred embodiments of a heat exchanger 113 and a bypass valve 115 are shown. In bypass valve 115, inlet and outlet openings 44, 46 are formed in opposed plug walls 114, 116 and this shows that inlet and outlet openings 44, 46 can be located anywhere in plug portion 26 as long as one of these openings is blocked when valve 115 is closed. Otherwise, bypass valve 115 is substantially similar to or can incorporate the features of the bypass valves 12, 70 and 80 described above. In the embodiment of FIG. 9, plate 38 (which preferably is dimpled but may be flat) and a bottom plate 118 (which may also be dimpled or flat), together form a tubular member 120 which is one of the tubular members that make up heat exchanger 113. Tubular member 120 is actually a bypass channel and has flow openings 122 that communicate with the flow openings in the adjacent enlarged distal end portions 16 of adjacent tubular member 14, and as such forms part of the inlet and outlet manifolds of heat exchanger 113. Instead of tubular member 120, a regular tubular member 14 could be used in heat exchanger 113, if desired. This would produce a full flood or single pass heat exchanger. Tubular members 14 may or may not have turbulizers in them or be made of dimpled plates, but the bottom tubular member 120 likely would not be turbulized or have other types of flow augmentation, such as dimples.

In the assembly of heat exchangers 10, 100 and 113, the various components, such as the tubular members 14 or 120 and fins 18 are stacked together along with dimpled plates 20, if desired, and upper and lower dimpled plates 36, 38. Mounting plates or brackets 40 and inlet and outlet fittings 28, 30 can be preassembled to upper and lower dimpled plates 36, 38, or assembled along with all of the other components. The housing 42 of the preferred bypass valve 12, 70, 80 or 115 (without any other bypass valve components) is then placed in the desired location in the heat exchanger and the entire assembly is brazed together in a brazing furnace. It will be appreciated that in the preferred embodiments, aluminum or a brazing-clad aluminum is used for most of the parts of the heat exchangers, so that all of the parts can be brazed together in a brazing furnace. After this assembly is cooled, the desired actuator components of the bypass valves are inserted into housing 42 and the removable closures 54 are secured in position with split pins 58.

Having described preferred embodiments of the invention, it will be appreciated that various modifications can be made to the structures described above. For example, instead of using a thermal motor or solenoid type actuator for the bypass valves, other devices could be used as well, such as a bimetallic helix to move the barrel or plunger of the valve. The tubular members can also have other shapes or configurations as well.

From the above, it will be appreciated that the bypass valves of the present invention are in the form of plugs that can be plugged in at any desired location in the heat exchanger with a simple rearrangement of the location of some components. The bypass valve housings actually act as a form of baffle plate to intermittently block flow between manifold portions of the heat exchangers. In fact, the bypass valves could be plugged in anywhere in the heat exchangers where it is desired to have bypass flow between the plate pairs or tubes. The bypass valve housings are brazed in place along with all of the other heat exchanger components. The actual valve elements in the actuators are then removably or releasably located in the bypass valve housings to complete the assembly. No external tubing or peripheral components are required to make the actuator valves active As will be apparent to those skilled in the art in the light of the foregoing disclosure, many alterations and modifications are possible in the practice of this invention without departing from the spirit or scope thereof. The foregoing description is of the preferred embodiments and is by way of example only, and it is not to limit the scope of the invention.

What is claimed is:

1. A heat exchanger comprising:
a plurality of tubular members disposed in a stack, the tubular members having spaced-apart wall portions including flow openings for the flow of fluid between the tubular members;
a bypass valve including
a housing having
a hollow plug portion with opposed plug walls, one of the plug walls having defined therein one of an inlet and an outlet opening, said plug portion further having defined therein the other of the inlet and outlet opening; said plug portion being disposed in the stack with the plug walls being sealingly mounted between selected ones of said spaced-apart wall portions to allow fluid flow between said inlet and outlet opening and respective flow openings in said selected ones of said spaced-apart wall portions;
an actuator portion located adjacent to the plug portion; and
an actuator mounted in the actuator portion and having a plunger extending into the plug portion, the plunger reciprocating to block and unblock said one of the inlet and outlet opening.

2. A heat exchanger as claimed in claim 1 wherein the tubular members are formed of plate pairs having enlarged distal end portions joined together to form adjacent inlet and outlet manifolds, said selected ones of said spaced-apart wall portions being formed in the distal end portions of an adjacent plate pair from each manifold, so that fluid can flow between the inlet and outlet manifolds when the flow through the bypass valve is unblocked.

3. A heat exchanger as claimed in claim 1 wherein the actuator is a temperature responsive actuator having a central shaft mounted in the housing actuator portion and a reciprocating barrel portion forming said plunger.

4. A heat exchanger as claimed in claim 3 wherein the actuator is a thermal motor adapted to extend axially upon being heated to a predetermined temperature and to retract upon being cooled below said predetermined temperature.

5. A heat exchanger as claimed in claim 1 wherein the actuator includes a solenoid having a central actuator shaft attached to the plunger the shaft extending upon energization of the solenoid, so that the plunger blocks flow between the inlet and outlet openings, and further comprising bias means for urging the actuator shaft to retract upon de-energization of the solenoid.

6. A heat exchanger as claimed in claim 5 and further comprising a temperature sensor electrically coupled to the solenoid for activation of the solenoid when the temperature of the fluid going to the heat exchanger reaches a pre-determined temperature.

* * * * *